US00RE37108E

(19) United States
(12) Reissued Patent
Neely

(10) Patent Number: US RE37,108 E
(45) Date of Reissued Patent: Mar. 27, 2001

(54) TUFTING MACHINE WITH SELF-ALIGNING GAUGING MODULES

(75) Inventor: Marshall Allen Neely, Soddy Daisy, TN (US)

(73) Assignee: Card-Monroe Corp., Hixson, TN (US)

(21) Appl. No.: 08/826,213

(22) Filed: Mar. 27, 1997

Related U.S. Patent Documents

Reissue of:
(64) Patent No.: 5,400,727
Issued: Mar. 28, 1995
Appl. No.: 08/124,723
Filed: Sep. 21, 1993

U.S. Applications:

(63) Continuation of application No. 07/877,827, filed on May 1, 1992, now Pat. No. 5,295,450.

(51) Int. Cl.[7] ..... D05C 15/08
(52) U.S. Cl. ..... 112/80.45
(58) Field of Search ..... 112/80.4, 80.45, 112/80.6, 80.5, 80.51–80.53, 80.01, 80.55, 80.59; 66/208, 207, 114

(56) References Cited

U.S. PATENT DOCUMENTS

| | | | | |
|---|---|---|---|---|
| 2,562,939 | | 7/1951 | Noe . | |
| 2,750,772 | | 6/1956 | Bellini | 66/86 |
| 2,800,096 | * | 7/1957 | Signoret | 112/80.59 |
| 2,889,791 | * | 6/1959 | Fedevich | 112/80.45 |
| 3,485,195 | | 12/1969 | Torrence | 112/226 |
| 3,618,542 | | 11/1971 | Zocher | 112/222 |
| 3,757,709 | | 9/1973 | Cobble | 112/79 R |
| 4,138,956 | | 2/1979 | Parsons | 112/226 |
| 4,170,949 | | 10/1979 | Lund | 112/79 R |
| 4,175,497 | | 11/1979 | Lund | 112/80.6 |
| 4,195,580 | | 4/1980 | Hurst | 112/79 R |
| 4,303,024 | | 12/1981 | Bardsley | 112/79 R |
| 4,313,388 | | 2/1982 | Biggs et al. | 112/79 R |
| 4,528,921 | | 7/1985 | Slattery | 112/79 R |
| 4,574,716 | | 3/1986 | Czelusniak, Jr. | 112/79 R |
| 4,608,934 | | 9/1986 | Card et al. | 112/80.6 |
| 4,637,329 | | 1/1987 | Czelusniak, Jr. | 112/80.45 |
| 4,667,611 | | 5/1987 | Yamamoto et al. | 112/116 |
| 4,669,171 | | 6/1987 | Card et al. | 29/446 |
| 4,691,646 | | 9/1987 | Card et al. | 112/80.6 |
| 4,693,191 | | 9/1987 | Card et al. | 112/80.6 |
| 4,739,717 | | 4/1988 | Bardsley | 112/80.5 |
| 4,841,886 | * | 6/1989 | Watkins | 112/80.52 X |

FOREIGN PATENT DOCUMENTS

| | | | | |
|---|---|---|---|---|
| 2004726 | | 8/1971 | (DE) . | |
| 2503563 | * | 8/1976 | (DE) | 112/80.6 |
| 2828278 | | 4/1979 | (DE) . | |
| 1335906 | | 10/1973 | (GB) . | |
| 1418123 | | 12/1975 | (GB) . | |
| 1597733 | | 5/1978 | (GB) . | |
| 1541074 | * | 2/1979 | (GB) | 112/80.51 |
| 1594626 | | 8/1981 | (GB) . | |
| 2076441A | | 12/1981 | (GB) . | |
| 2104925A | | 3/1983 | (GB) . | |
| Wo90/96391 | | 6/1990 | (WO) . | |

OTHER PUBLICATIONS

Photograph of guide bar and looper block assembly (undated).
Photograph of guide bar and knife block assembly (undated).

* cited by examiner

*Primary Examiner*—Ismael Izaguirre
(74) *Attorney, Agent, or Firm*—Womble Carlyle Sandridge & Rice, PLLC

(57) ABSTRACT

Symmetrical, modular blocks each having a plurality of fixed, equally spaced, gauging elements, namely loopers, needles, and reeds protruding therefrom, the blocks are positioned on the sides of the guide bars of a tufting machine, each guide bar having transverse channels at equally spaced intervals. These channels respectively receive guide bars of the blocks when the blocks are removably positioned on the sides of the guide bar. Bolts or screws secure the blocks in place on their guide bars so that their needles, loopers, and reeds are appropriately gauged and positioned for tufting action, protruding toward the tufting zone.

52 Claims, 1 Drawing Sheet

TUFTING MACHINE WITH SELF-ALIGNING GAUGING MODULES

Matter enclosed in heavy brackets [ ] appears in the original patent but forms no part of this reissue specification; matter printed in italics indicates the additions made by reissue.

This is a continuation of application Ser. No. 07/877,827, filed on May 1, 1992, now U.S. Pat. No. 5,295,450.

BACKGROUND OF THE INVENTION

This invention relates to a tufting machine with self-aligning gauging modules and is more particularly concerned with a tufting machine with replaceable gauging elements which can be readily installed and removed.

Tufting machines are products which must be built with precision so that the needles of the machine are accurately spaced from each other along the needle bar or bars and the loopers are accurately uniformly spaced from each other so that their bills respectively pass closely adjacent to the needles for engaging and holding loops of yarns carried by the needles. Furthermore, the spacing of the reeds must be accurate so as not to interfere with the travel of the needles. When building a machine, any error or tolerance in positioning these gauging elements, namely the needles, the loopers, and the reeds, may accumulate as the work progresses. The present invention seeks to establish a consistency for all such cross over parts throughout the machine.

In the past, holder assemblies have been devised in which groups of knives for loopers have been arranged in pre-assembled or modular fashion in a knife holder, each knife holder having a guide mechanism which enables the knives, as a group, to be positioned on a carrying member of a tufting machine and maintained in appropriate alignment. U.S. Pat. Nos. 4,608,934; 4,669,171; 4,691,646; and 4,693,191 illustrate such prior art knife holder assemblies in which parallel knives are disposed in juxtaposition in guide bars which are provided with guides for guiding and then clamping them in appropriate positions on a tufting machine.

SUMMARY OF THE INVENTION

Briefly described, the present invention includes a modular member having a holder or block which is cast around the end portion of a plurality of gauging elements, such as needles, loopers, and reeds which are spaced quite accurately from each other and are held in cantilever fashion so that they protrude, in appropriate alignment and gauging, from the block or holder. The blocks or holders are all of the same precise width, the back side of each holder or block being provided with a central T-shaped tab or alignment member which includes a longitudinally extending guide and a transversely extending shoulder. The longitudinally extending guides are respectively received in transversely spaced slots in gauge bars of the machine, the block and the gauge bar being provided with a pair of aligned holes through which a detent is passed when the transverse shoulder abuts an edge of the gauge bar. The slots are quite accurately, equally spaced from each other and are parallel to each other and perpendicular to a plane of a surface of the gauge bar. A plurality of such blocks are arranged along the surface of the gauge bar and are appropriately positioned on the gauge [bas] *bar* so that the protruding central guides are respectively received in the slots and are quite accurately spaced from each other. The width of each block is about equal to the distance between centerlines of the adjacent slots so that the edges of the blocks abut each other.

Accordingly, it is an object of the present invention to provide a tufting machine and a method of producing the tufting machine so that the gauging elements of the tufting machine are automatically positioned in appropriate alignment when installed, thereby reducing to a minimum the need for sew-off of a newly constructed machine.

Another object of the present invention is to provide a tufting machine which is inexpensive to manufacture, durable in structure and efficient in operation.

Another object of the present invention is to provide a tufting machine in which there is a consistency established for all cross over parts, such as the needles and loopers, [are] in appropriate registry when installed on the machine, that they need no adjustment, and the knives which cooperate with the loopers provide uniform tension on the loopers thereby providing longer wearing of the moving parts.

Another object of the present invention is to reduce the necessity for individual sew-offs of section upon section of the tufting machine, thereby reducing fabric waste and labor required for the sew-off.

Another object of the present invention is to provide a modular element for a tufting machine, this element being readily and easily positioned in a nonmovable location on the tufting machine which nonmovable location is engineered into the tufting machine and enables the ready replacement of one modular unit by another.

Another object of the present invention is to provide in a tufting machine, a plurality of transverse slots along the longitudinally extending gauge bar members of the tufting machine, these slots acting as gauging members for the subsequent positioning of modular blocks which carry the reeds, needles, hooks, and loopers, the blocks being so dimensioned that the gauge elements, such as the reeds, hooks, and loopers, are appropriately positioned with respect to each other for efficient sewing in a tufting zone.

Another object of the present invention is to provide, in a tufting machine, structure which will establish a centerline of a modular body which will enable the modular body to be correctly positioned to automatically position the gauging elements, such as hooks, loopers, needles, and reeds.

Another object of the present invention is to provide, in a tufting machine, a structure which will prevent the needles, loopers, and reeds from being inadvertently misaligned with each other.

Another object of the present invention is to provide in a tufting machine, a system which can facilitate the rapid change over of loopers, hooks, or reeds when one or more of these items are damaged, thereby reducing to a minimum the downtime of the tufting machine.

Another object of the present invention to provide a process or method of producing a tufting machine wherein the danger of accumulated tolerance buildup is reduced to a minimum.

Another object of the present invention is to provide in a tufting machine, a modular member which will prearrange a plurality of gauging elements embedded therein so that they will not readily shift or change position during operation of the tufting machine.

Other objects, features, and advantages of the present invention will be become apparent from the following description when considered in conjunction with the accompanying drawing wherein like characters of reference designate corresponding parts throughout the several views.

DETAILED DESCRIPTION OF THE PREFERRED EMBODIMENT

Figures 1, 2, 3, 4:
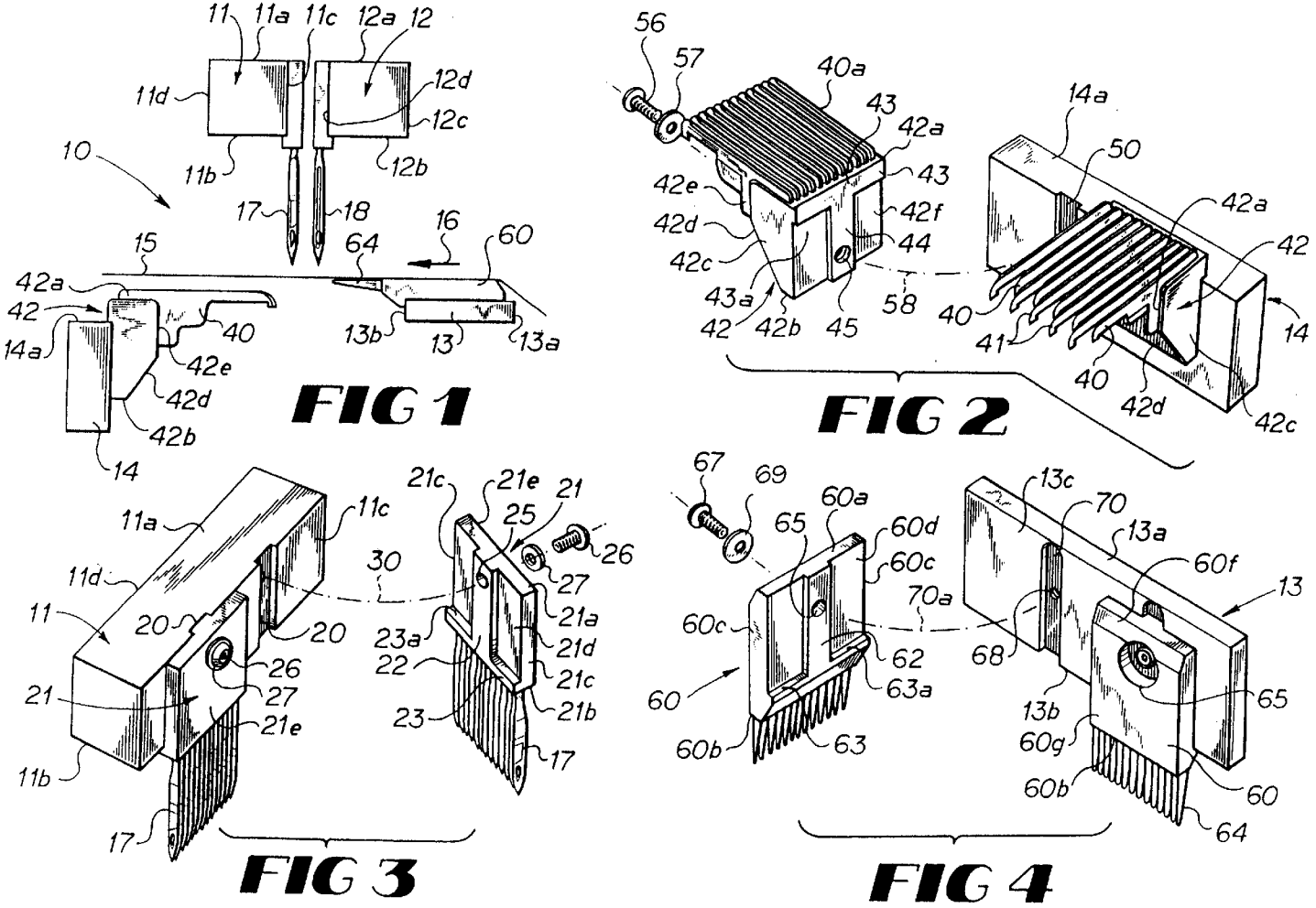
FIG. 1 is a schematic [Side] *side* elevational view of the tufting zone of a tufting machine constructed in accordance with the present invention.
FIG. 2 is an enlarged, exploded, fragmentary, perspective view of a portion of the looper gauge bar and looper block assemblies of the tufting machine depicted in FIG. 1.
FIG. 3 is an enlarged, exploded, fragmentary, perspective view of a needle bar and the needle block assemblies of the tufting machine depicted in FIG. 1.
FIG. 4 is an enlarged, exploded, fragmentary, perspective view of the bed plate and the reed block assemblies of the tufting machine depicted in FIG. 1.

Referring now in detail to the embodiment chosen for the purpose of illustrating the present invention, numeral 10 in FIG. 1 denotes schematically the tufting zone of a cut pile tufting machine having laterally shiftable needle bars 11 and 12, a gauge bar for reed modules 13 and a looper block gauge bar 14. A backing material 15 moves across the tufting zone 10 in the direction of the arrow 16, in a conventional way. The rear needle bar 11 is adapted to support a transverse row of downwardly extending, equally spaced rear needles 17 and the front needle bar 12 is adapted to support a transverse row of equally spaced front needles 18 so that these needles 17 and 18, respectively, insert yarns (not shown) through the backing material 15 for each reciprocation of the needle bars 11 and 12 for producing transverse rows of tufts in the backing material 15. Thus, the needle bars 11 and 12 form gauge bars for supporting the blocks which carry needles 17 and 18, as will be explained hereinafter.

The needle bar 11, in cross-section, is a square or rectangular member which extends transversely across the backing material 15 and, as pointed out above, can be reciprocated laterally, as is well known in the art. In like fashion, the front needle bar 12 is also a rectangular or square in cross-section and is reciprocated vertically with needle bar 11 and also is shiftable laterally with respect to the backing material 15. Needle bar 11 has a flat, horizontally disposed upper surface 11a, a flat, horizontally disposed lower surface 11b, a flat, vertical, front surface 11c and a flat, vertical rear surface 11d. In like fashion, the front needle bar 12 has a flat, horizontally disposed upper surface 12a, a flat, horizontally disposed lower surface 12b, a flat, vertically disposed front surface 12c, and a flat, vertically disposed rear surface 12d. The surfaces 11c and 12d are in spaced, opposed, parallel relationship.

As it is best seen in FIG. 3, the rear needle bar 11 is provided with a plurality of vertically disposed equally spaced, outwardly opening straight, upright, guide recesses, slots, or channels, such as guide channel 20, each of which extends vertically from the upper surface 11a to the lower surface 11b and along the surface 11c. These equally spaced guide channels, slots, or recesses 20 are, thus, open sidewise and at both ends and are defined by flat opposed parallel sides and flat bottoms and are each of uniform width and depth throughout their entire length. Each channel 20 is open, at least, along the lower surface 11b. There is one recess, slot or channel 20 for each modular needle block 21.

In like fashion, the surface 12d is provided with the same type of evenly spaced channels, recesses, or slots (not shown) which are complimentary to the slots 20 of the needle bar 11.

According to the present invention, removably received on the front surface 11c of needle bar 11 are a plurality of modular, transversely extending, juxtaposed needle mounting blocks 21, each of which is identical. Each needle mounting block 21 including a straight, upper surface 21a, a straight, lower surface 21b, a pair of parallel, opposed, vertical edges or side surfaces 21c, a rear surface 21d, and a front surface 21e. The lower surface 21b is parallel to the upper surface 21a and the side surfaces 21c are parallel to each other and perpendicular to the upper and lower surfaces 21a and 21b.

There is provided on the rear or back surface 21d of each needle mounting block 21, a T-shaped, raised area which defines an alignment member. In more detail, this T-shaped alignment member protrudes rearwardly from the back surface 21d and includes a vertically disposed central guide bar, rib, or tab 22 and a transversely disposed abutment bar 23, the abutment bar 23 extending transversely across the lower end of bar 22 and along the lower edge portion of the needle mounting block 21. The guide bar 22 extends vertically, parallel to and midway between the side surfaces 21c and intersects the central portion of the transversely extending abutment bar 23. The inner edge of the abutment bar 23 forms a shoulder, ledge, or stop 23a which is perpendicular to surface 21d and which forms a stop or abutment for arresting upward movement of the needle mounting block 21. This shoulder 23a is a straight ledge which fits flush against the bottom surface 11b.

Protruding from the lower or bottom surface 21b of the block 21 are a plurality of equally spaced needles 17, the eyes of which are at the distal end portions of the needles, the proximal ends of the needles 17 being cast with and embedded in the block 21. All needles 17 are parallel to each other, extend parallel to surface 21d and are equally spaced from each other, being spaced from each other by the gauge of the machine, such as to provide ten needles per inch, for example. The outer needles 17 of each block 21 are slightly inwardly of side surfaces 21c so that when a side surface 21c of one block abuts the side surface 21c of the next adjacent block 21, the needles 17 of the adjacent blocks 21 are spaced apart by a single gauge of the machine.

The width of the block 21 from edge 21c to the other edge 21c is approximately equal to the distance between the centerlines of adjacent, vertical slots or recesses 19 20 so that the edge or side surface 21c of one block 21 abuts the adjacent edge 21c of the adjacent block 21 when the guide bars 22 of the two blocks 21 are received in their adjacent slots 20. Thus, the width of the guide bar 22 is approximately equal to the width or distance between the opposed straight sides which define slot 20. The clearance, however, is sufficient to permit the easy insertion of a replacement block 21 between adjacent blocks 21 on guide bar 22 so that all shoulders 23a abut the bottom edge 11b.

At the upper, central portion of the block 21 there is provided a central hole 25 passing through block 21, bar 22, and through which a screw 26 is passed, when the block 21 is to be secured in place. The screw 26 is threadedly received within [an externally] *a* threaded hole within the needle bar 11 so as to form a detent to lock the block 21 flat against the side 11c when screw 26 is tightened. The screw 26 is provided with a washer 27, the broken line 30 in FIG. 3 indicating the path of the screw 26. When screw 26 is tightened in position, the inner surface 21d of the block 21 is received and urged flat against the surface 11c while the shoulder 23a is snugly received against the surface 11b, thereby removably fixing the position of the block 21 in an upright position with respect to the needle bat 11. With a plurality of the blocks 21 being appropriately mounted side-by-side in juxtaposition, as shown in FIG. 3, along the entire length of the needle bar 1, the needles 17 of blocks 21 will automatically and accurately be spaced from each other by the gauge of the machine, the distance from the axis of one end needle 17 of one block 21 to the axis of the adjacent needle 17 of the next adjacent block 21 being equal to the spacing between adjacent needles within a single block 21. The needles 17 and a block 21 forming a modular block assembly.

The blocks 21 are installed along surface 12d of needle bar [11] *12* in the same way in which blocks [17] *21* are installed on needle bar [12] *11*, so that the blocks [17] *21* of needle bar 11 are back-to-back with blocks [17] *21* on needle bar 12.

As best seen in FIG. 2, the loopers for receiving and holding loops of yarns (not shown) which are sewn by the needles 17 and 18 through the backing 15, are arranged in alternate short loopers 40 and long loopers 41 in one embodiment shown in FIG. 2 or, when cooperating with a single row of needles 17, simply as a single row of uniform length loopers 40a, in a second embodiment also shown in FIG. 2. These loopers 40, 41, and 40a are essentially conventional cut pile loopers, however, they are all embedded by their proximal end portions in their looper blocks 42. Thus, in one embodiment, between each adjacent pair of loopers 40 there is a looper 41 and vice versa. It is preferable, however, that one long looper 41 be provided at one end portion of block 42 while one short looper 40 be provided adjacent to the other end or side of the looper block 42. Thus, an equal number of long loopers 41 and short loopers 40 are provided in adjacent blocks 42.

Each block 42 is shaped as shown in FIGS. 1 and 2, having two parallel side walls or surfaces 42c which are vertically disposed, a top surface 42a and a bottom surface 42b. Furthermore, the looper block 42 is provided with an upwardly and outwardly inclined surface 42d. The upper surfaces of the loopers 40 and 41 are in a common plane parallel to and slightly above the surface 42a. Also, each looper 40 or 41 protrudes beyond the outer surface 42e of the looper block in cantilever fashion.

According to the present invention, the rear surface 42f of the modular block 42 is provided with a raised, T-shaped, alignment member which includes an upper, horizontally disposed abutment bar 43 and a vertically disposed, elongated guide bar, rib, or tab 44, the guide bar 44 being disposed centrally along the vertical centerline of the block 42 so that it is of equal distance between the sides 42c of the block 42. The upper end portion of bar 44 merges with the central portion of the transverse abutment bar 43. Thus, the transverse abutment bar 43 provides a transverse shoulder or ledge 43a which overhangs and rests against the upper surface 14a of the looper gauge bar 14.

The looper gauge bar 14 is a rectangular bar which extends transversely across the machine and may be segmented, as desired. This gauge bar 14 is rocked back and forth in a conventional, timed relationship to the reciprocation of needle bars 11 and 12[, gauge]*Gauge* bar 14 includes a plurality of equally spaced, vertically disposed, transversely cut, sidewise opening, grooves, channels, slots, or recesses such as slot 50, which respectively receive the straight, non-circular tab or guide bars 44 of the respective looper blocks 42, sidewise, thereof. The bottom portion of each looper block 42 is provided with a central hole 45 which extends through the block 42 and through the vertical guide bar 44 as seen in FIG. 2. A bolt or screw 56 having a washer 57 protrudes through the hole 45 and is threadedly received in a hole (not shown) in the gauge bar 14. The travel of the bolt 56 being illustrated by the broken line 58 in FIG. 2.

By such an arrangement, the modular looper blocks 42 are disposed side-by-side adjacent to each other on the common gauge bar 14, the spacing of the blocks 42 along this common gauge bar 14 being such that the loopers 40 and 41 are staggered throughout the transverse length of the gauge bar 14 or the loopers 40a are all of uniform length.

When the modular looper blocks 42 are arranged in juxtaposition on the gauge bar 14, the shoulder 43a of each looper block 42 rests on the upper edge portion of surface 14a so as to resist any tendency of the block 42 to rotate and to cooperate in resisting not only rotation of the block 42 but movement of the block downwardly, the vertical bar or alignment guide 44 preventing any appreciable lateral movement of the block 42 on the gauge bar 14. Thus, the loopers 40 and 41 protrude forwardly into the tufting zone 10 and are arranged to cooperate respectively with the needles 17 and 18 to pass adjacent to and catch the loops of yarns as the needles insert those yarns through the backing material 15.

With respect to the reed gauge bar 13, there are provided a plurality of modular reed carrying blocks 60 which are shaped quite similarly to the block 21, in that each is a rectangular block having a T-shaped alignment member. In more detail, the modular block 60 includes a front surface 60a, a rear surface 60b, and a pair of opposed, parallel side surfaces [63c] *60c*. The back surface 60d is provided with the T-shaped alignment member which includes the centrally located guide bar or rib 62 and the transversely disposed abutment bar 63. The transverse abutment bar 63 is provided with a shoulder 63a which is adapted to abut the rear edge 13b of the reed gauge bar 13.

Modular block 60 is a rectangular block whose leading upper corner portion is bevelled to provide a bevelled surface 60f over which the backing material 15 passes. This block 60 is also provided with an upper surface 60g over which the backing material 15 passes after passing over the surface 60f. The rear edge portion 60b of the block 60 receives, permanently embedded therein, the distal ends of a plurality of equally spaced rearwardly protruding reeds 64. The upper surfaces of the reeds 64 are generally parallel to the top surface 60g of the block 60. The distal ends of the reeds 64 are rounded and these reeds 64 taper from their embedded proximal ends rearwardly to the rounded extremities at their distal ends.

The reed gauge bar 13 extends transversely of the tufting machine and has a plurality of longitudinally extending channels, recesses, or slots 70 which are milled at equally spaced intervals transversely with respect to the [bed rail 12] *reed gauge bar 13*, as seen in FIG. 4. Each slot 70 opens upwardly and rearwardly of the machine and terminates inwardly of the forward edge 13b of the bed rail 13. The slots 70 are equally spaced from each other, the centerlines of slots 70 being approximately equal to the width of the modular block 60. The slots 70 are longer than the length of the guide bar 62 so that the guide bar 62 may be received wholly therein with the abutment shoulder 63, with the ledge 63a of transverse bar 63 abutting the rear edge 13b of the bed rail 13. Thus, the guide bar 62 and the transverse bar 63 of each modular reed block 60 position each block 60 appropriately on the upper surface 13c of the bed rail 13 in juxtaposition with other modular reed blocks 60. For locking each modular reed block 60 in place, the central forward portion of the block 60 is provided with a counter sunk hole 65 which is aligned with a hole, such as hole [66] *68*, in a slot or recess 70 of the bed rail 13, when the block 60 is appropriately positioned. A bolt or screw [66] *67* having a washer [67] *69* protrudes through hole 65 and is threadedly received in the hole 68, when the block 60 is appropriately positioned on the reed gauge bar 13. The counter sinking of the hole 65 enables the head, screw, or bolt 67 to be totally recessed beneath the surface 60g so that the bolt 67 does not interfere with the movement of the backing 15 across the surface 60g.

The various modular blocks 21, 42, and 60 of the respective modular assemblies may each be readily replaced as a unit in combination with their protruding members, the needles 17 or 18, the loopers 40 and 41, or the reeds 64, as the case may be. The arrangement of the modular T-shaped alignment member on each of the modular blocks enables the positive positioning of that block 21, 42, or 60 in its appropriate position by the installation of a single screw or bolt 26, 56, or 67, as the case may be. When this bolt is tightened in place, the self aligning modular block 21, 42, or 60 positively positions, i.e., needles 17, 18, loopers 40 and 41, and reeds 64, in appropriate alignment and extending toward the tufting zone 10, without further effort.

The side-by-side disposition of the modular blocks 21, 42, or 60 assures that each block is quite snugly retained from appreciable movement by one or both sides of adjacent blocks and assures that there is a proper spacing for the blocks, such as the needles 17 or 18, the loopers 40 and 41, and the reeds 64 within the tufting machine. Since the blocks 21, 42, and 60 are cast within narrow tolerances and are symmetrical, they fit perfectly in place and align the needles, loopers, and reeds for cooperative action.

While I have chosen to illustrate a tufting machine with cut pile loopers 40 and 41, it will be readily apparent to one skilled in the art that the block 42 can be readily used for loop pile loopers (not shown).

The process or method of producing the tufting machine of the present invention, reduces to a minimum the likelihood of the needles being improperly spaced from each other and the loopers being improperly spaced from each other and the reeds being improperly spaced from each other. Furthermore, the method or process of producing the tufting machine of the present invention also reduces to a minimum the likelihood that the needles will be misaligned with respect to the loopers or that the loopers would be misaligned with respect to the needles or that the needles would be misaligned with respect to the reeds or that the reeds be misaligned with respect to the needles. The reason that danger of misalignment is reduced to a minimum is that each slot 20 or channel 20, 50, and 70 is a straight transverse cut milled to a proper uniform width so that the corresponding guide or tab 22, 44, or 62, as the case may be, will be snugly received between the opposed sides defining each channel 20, 50 or 70, and in its appropriate slot or channel 20, 50 or 70 and so that there is no appreciable lateral movement of the modular block 21, 42, or 60 and no appreciable rotational movement of any of these blocks. Furthermore, the centerlines of each milled channel is measured quite accurately from one end of a gauging element such as needle bar 11, needle bar 12, reed gauge bar 13, or looper bar 14. In other words, in producing the quite accurate gauge elements, the channels are cut successively, with each spacing of the channel being from a single reference point. Thus, the errors in spacing do not accumulate.

The blocks 21, 42, and 60 are cast with precision, with the needles 17 or the loopers 40, 41, or 40a, as the case may be, being accurately held in place in the mold at equally spaced distances as the block is cast and solidified. The guide bar or tab 22, 44, or 62, as the case may be, is integrally cast with its associated block and is quite carefully centrally located so as to be equidistant from the ends of the associated block.

The blocks are then installed on their associated gauging bars so that the hole which are provided in the respective elements are aligned for the screws or bolts 26, 56, or 67 to be inserted and tightened in place, locking their associated blocks in their appropriate positions. By carefully maintaining the appropriate width of each guide bar or tab 22, 44, or 62, each such guide bar or tab is snugly received in its associated channel so as to quite positively retain the block in place against inadvertent movement with respect to its gauging bar. The casting cavity of each block 21, 42, and 60 and any milling is such that the width of each block is closely maintained and that each protruding element, is spaced inwardly of each edge by a distance equal to approximately or slightly less than the gauge between needles or loopers or reeds, as the case may be.

The modular block, when being assembled, are disposed side-by-side at proper distances from each other because of the tab or bar 22, 44, or 62 being centered by being received in the appropriate channel.

In positioning the respective gauge members, such as bars 11, 12, 13, and 14, in the tufting machine, at precisely measured locations, this assures that the channels of each of the gauge members is properly positioned so as to align the needles properly with the loopers and vice-versa and to align the reeds properly with the needles and vice-versa. In this way, the sewing-off time required for each tufting machine is reduced to a minimum.

It will be obvious to those skilled in the art that many variations may be made in the embodiment here chosen for the purpose of illustrating the present invention without departing from the scope thereof as defined by the appended claims.

I claim:

1. A gauging module assembly for being selectively received over *at least* one *recess* of a plurality of [equally] spaced sidewise opening [channel shaped] recesses [along] *defined in* a side surface of a gauge bar of a tufting machine*, said gauge bar also defining detent receiving holes within said side surface, said gauging module assembly* comprising:

(a) a modular block having a front surface, a pair of side surfaces opposed to each other*,* and a rear surface opposite to said front surface*, said modular block defining a hole therein*;

(b) a plurality of [equally] spaced, parallel, tufting machine gauging elements protruding from said *modular* block, each of said tufting machine gauging elements having a proximal end and a distal end, the proximal end of each of said *gauging* elements being embedded in a fixed, retained, condition in said *modular* block, said elements protruding in transverse parallel alignment with each other, from said block;

(c) [an] *at least one* elongated tab [fixed] on the rear surface of said *modular* block for being received sidewise [in any one of said spaced recesses in said] *in at least one of the recesses of the spaced recesses defined in the side surface of the* gauge bar [on said tufting machine,] when said modular block is positioned with its rear surface against said side surface of said gauge bar, said *at least one* tab centering said modular block on said gauge bar when said *at least one* tab is received in *at least* one of *the recesses* said spaced recesses; and (d) a detent for securing said modular block to said gauge bar, said modular block when attached to said gauge bar[,] being adapted to hold said spaced *gauging* elements in a fixed position protruding toward a tufting zone of said tufting machine with said distal ends of said spaced elements being in said tufting zone, said detent also urging said modular block toward said [said gauging block] *gauge bar* and said *at least one* tab into *at least* one of said recesses *as said detent is passed into said hole in said modular block and received into one of said detent receiving holes, said modular block being held in a vertically nonadjustable position with respect to said gauge bar when said elongated tab is received in at least one of the recesses of said spaced recesses and said detent is received in said one of said detent receiving holes.*

2. The gauging module assembly defined in claim 1 wherein said tufting machine gauging elements [include] *comprise* a plurality of tufting needless said needles having eyes at their distal end portions.

3. The gauging module assembly defined in claim 2 wherein said modular block is rectangular and has opposed parallel side surfaces, and wherein [said tufting machine gauging elements are straight members,] the outermost [members] *tufting machine gauging elements* being spaced inwardly from said side surfaces of said modular block by a distance *of* about one-half the spacing of said *gauging* elements from each other.

4. The gauging module assembly defined in claim 1 wherein said tufting machine gauging elements [are] *comprise* loopers.

5. The gauging module assembly defined in claim 1 wherein said modular block is rectangular and has parallel side surfaces, and wherein said tufting machine gauging elements are disposed in a common plane [which is] *with respect to one another, said plane being* approximately parallel to the [side] *front and rear* surfaces of said modular block.

6. The gauging module assembly defined in claim 1 including a stop [for forming with said] *positioned adjacent to said at least one* tab, *said stop and said at least one tab forming* a T-shaped member on said rear surface of said modular block, said stop protruding [on both sides of said tab] *along at least a portion of the length of said modular block with respect to said at least one tab.*

7. [A] *In a* tufting machine of the type in which a reciprocating looper gauge bar moves toward and away from a tufting zone as needles of the tufting machine are reciprocated *toward and away from the tufting zone* for inserting yarns through a backing material, the improvement comprising:

(a) said looper gauge bar having a prescribed length and a flat side [and being provided with] *defined on the looper gauge bar, said flat side defining* a plurality of [equally] spaced, [parallel, sidewise opening,] recesses along said flat side *and also defining a plurality of spaced detent receiving holes therein*;

(b) a plurality of symmetrical, substantially identical, modular mounting blocks mounted side by side on said flat side of said *looper* gauge bar, *each of said modular mounting blocks defining a hole therein*;

(c) a plurality of equally spaced loopers carried by each of said modular *mounting* blocks, said loopers being [imbedded] *embedded* in each of said modular mounting blocks so that each *said modular mounting* block retains the loopers in *a* spaced, parallel relationship *with respect to one another* according to [the] *a predetermined* gauge of the tufting machine, each [of] said modular [blocks] *mounting block* being provided with a tab [which is received sidewise within one of said] recesses [that block is] *for being received sidewise within one of said spaced* recesses when [that block is] *defined in said flat side of the looper gauge bar when said modular mounting blocks are* moved toward said *looper* gauge bar; and (d) *a* detent [means individual to] *for* each of said modular mounting blocks for removably securing that *modular mounting* block against the flat side of said *looper* gauge bar in a fixed position with respect to the other modular *mounting* blocks carried by said *looper* gauge bar *as each said detent is passed into said hole in said modular mounting block and into said detent receiving hole*, said detent [means] urging said tab into one of said *spaced* recesses and also urging said modular mounting block against said flat side of said *looper* gauge bar *to hold said modular mounting block in a vertically nonadjustable position with respect to said looper gauge bar.*

8. The tufting machine defined in claim 7, wherein each [tab] *respective one of said tabs* is T-shaped and includes [a] *an elongate* shoulder *extending at least partially* along [one] *an* edge portion of said modular mounting block for limiting sidewise movement of [that tab] *the respective ones of said tabs* within [sidewise] *the respective ones of* said [one of said] recesses and for preventing appreciable rotation of said modular mounting block with respect to said looper gauge bar.

9. The tufting machine defined in claim 7 wherein said detent [means] includes a bolt *for* passing through *said hole in* said modular mounting block and through said tab for removably securing [that] *each said modular mounting* block onto said looper gauge bar.

10. [Process] *A process* of producing a tufting machine, *the tufting machine* having a tufting zone therein, *said process* comprising the steps of:

(a) [producing] *forming* a plurality of equally spaced, parallel, transverse, sidewise opening, straight recesses across one side portion of an elongated gauge bar of the tufting machine, each of said recesses having equally spaced parallel centerlines, *and forming a plurality of detent receiving holes within said side of said gauge bar*;

(b) installing said gauge bar transversely of the tufting machine so that said centerlines of said recesses extend toward the tufting zone of the tufting machine;

(c) producing a plurality of substantially identical modular [block assemblies] *blocks,* wherein each *said* modular block [assembly] has opposed parallel side surfaces, a bottom [portion] *surface*, and a rear surface[, and so that the width between said side surfaces is approximately equal to the width between the centerline of adjacent recesses in said gauge bar] *and defines a hole therein*;

(d) permanently embedding *spaced gauging elements* by their proximal end portions in each of said modular blocks [has the same number of equally spaced, parallel gauging elements] , in parallel relationship to said side surfaces [and] so that the gauging elements protrude from the *respective* bottom [portions] *surfaces* of said modular blocks and so that the outermost gauging elements of each of said modular blocks are respectively spaced inwardly of said parallel side surfaces of each modular blocks by a distance equal to approximately one-half the distance between centerlines of said gauging elements;

(e) [producing,] *forming* on the rear surface of *each of* said modular blocks, an elongated straight non-circular

[tabs, each of] *tab,* which is equally spaced from said side surfaces and is approximately the width of one of said recesses; and (f) securing said modular blocks side-by-side on said side portion of said gauge bar [and with] *by passing a detent associated with each said modular block into each said respective hole in each said respective modular block and into one of said detent receiving holes so that* the respective tabs of said modular blocks *are* received respectively in said recesses [and] *to secure each said respective modular block to said gauge bar in a vertically nonadjustable position* so that all *of said* gauging elements extend toward the tufting zone of said tufting machine [for], thereby spacing [all of] said gauging elements from their adjacent *gauging* elements by substantially the same amount.

11. The process defined in claim 10 wherein the modular blocks are removably secured to said [guide] *gauge* bar, and including the step of replacing selected modular blocks with new modular blocks [whenever a gauging element is damaged].

12. The process defined in claim 11 including the [steps] *step* of producing [on said block] an [alignment] *abutment* bar [which is] *on each said modular block, said abutment bar being* perpendicular to the [guide bar] *elongated tab* and [abuts] *abutting* a surface of said [guide] *gauge* bar [member] when each *respective* one of said modular blocks is installed on said [guide] *gauge* bar [member].

13. The process defined in claim 12 wherein the step of securing said modular blocks to said [guide] *gauge* bar includes the *step of* inserting the [guide bar] *tab* of each *said* modular block in a [channel] *recess* of said [guide] *gauge* bar so that the abutment bar is spaced from said [guide] *gauge* bar, and progressively moving each of said modular blocks [transversely of] *toward* said [guide] *gauge* bar for causing said abutment bar to abut said [guide] *gauge* bar, and the step of securing the modular blocks on said [guide] *gauge* bar [include passing detents through said modular blocks and] *includes threading said detent* into *a detent receiving hole of* said [guide] *gauge* bar.

14. The gauging [modular] *module* assembly defined in claim 1 wherein said gauging elements are disposed in a plane parallel to the plane of said rear surface.

15. The gauging [modular] *module* assembly defined in claim 1 wherein said detent includes a bolt *individual to each of said respective modular blocks, and* passing *said detent* through said *respective* modular block and through said tab for threadedly engaging [said gauging] *the gauge* bar when said *at least one* tab is received within [one] *a respective one of the recesses* of said *spaced* recesses and is at a prescribed position [along said recess] *on the gauge bar*.

16. [A] *In a* tufting machine *of the type* having a tufting zone and a gauging assembly, the improvement comprising:

(a) a gauge bar having a fast side surface and a second side surface, said gauge bar being provided with a plurality of equally spaced, straight, transverse, channel shaped, outwardly opening parallel, recesses, *and said gauge bar defining detent receiving holes* across at least a portion of said first side surface of said gauge bar, said recesses each opening sidewise along said [second] *first side* surface, said recesses each being defined by a pair of opposed parallel sides;

(b) a plurality of generally rectangular modular blocks each having a flat rear surface for being received against said first side surface *of said gauge bar, each of said modular blocks defining a hole therein*;

(c) an alignment member secured to each of said modular blocks, said alignment member including:

(i) [a] *at least one* tab conforming to the shape of said opposed sides *and protruding from each of said modular blocks, said tab sized and shaped* for being received [therebetween] *within at least one of the spaced recesses* when [that] *the respective ones of said* modular [block] *blocks* containing said alignment member [is] *are* received against said first side surface; and (ii) a stop protruding from each of said modular blocks for engaging said second side surface and arresting movement of that modular block;

(d) a plurality of equally spaced parallel gauging elements protruding from said modular block toward said tufting zone; and (e) a detent *passing into the respective hole in each said modular block and into a detent receiving hole defined in the side surface of the gauge bar* for removably securing each *respective one* of said modular blocks against said gauge bar and simultaneously urging the *at least one* tab of each of said modular blocks into *at least* one of said recesses when said *at least one* tab is received in *a respective one of* said [recess] *recesses* and said stop engages the second side surface *wherein each said modular block is secured in a vertically nonadjustable position with respect to said gauge bar*.

17. The tufting machine defined in claim 16 wherein said first surface and said second surface interact essentially perpendicular to each other and wherein said tab extends to said stop.

18. The tufting machine defined in claim 16 wherein said stop forms a straight shoulder perpendicular to said tab and said recesses are perpendicular to said second surface.

19. The tufting machine defined in claim 16 wherein said gauging elements [are] *comprise* loopers and said gauge bar is a looper bar.

20. The tufting machine defined in claim [14] *16* wherein said gauging elements [are] *comprise* reeds and said gauge bar is a [bed rail] *reed gauge bar and said modular block also is secured in a horizontally nonadjustable position with respect to said gauge bar*.

*21. The tufting machine defined in claim 16, wherein said gauging elements comprise needles and said gauge bar comprises a needle bar.*

*22. The process defined in claim 10, wherein said gauging elements comprise loopers.*

*23. The process defined in claim 10, wherein said gauging elements comprise needles.*

*24. The process defined in claim 10, wherein said gauging elements comprise reeds and wherein each said modular block also is secured to said gauge bar in a horizontally nonadjustable position.*

*25. The gauging module assembly defined in claim 1, wherein said gauging elements comprise reeds and wherein said modular block also is held in a horizontally nonadjustable position with respect to said gauge bar.*

*26. A gauging module assembly for a tufting machine having an elongated gauge bar defining a substantially flat side extending along at least a portion of the length of the gauge bar, spaced recesses defined within the side of the gauge bar and extending at least partially along the length thereof and detent receiving holes defined within the side of the gauge bar, said gauging module assembly comprising:*

*a plurality of modular mounting blocks for being received on the side of the gauge bar, each said modular mounting block defining a hole therein and having:*

*(i) a rear surface;*

*(ii) spaced tufting machine gauging elements protruding from said modular mounting block, each said*

*gauging element having a proximal end and a spaced distal end, the proximal ends of said gauging elements being embedded in said modular mounting block so that the distal ends of said gauging elements extend away from the modular mounting block; and*

*(iii) at least one tab on said rear surface, said at least one tab being sized and shape to be received within at least one of the recesses of said spaced recesses;*

*wherein each of said modular mounting blocks is constructed ad arranged to be mounted on the gauge bar, respectively, so that the respective rear surfaces of each of said modular mounting blocks are received flatly against the side of the gauge bar as said at least one tab of each said modular mounting block, respectively, is moved sidewise into one of the recesses of said spaced recesses defined within the side of the gauge bar; and*

*a detent associated with each said modular mounting block and passing into said respective hole in each said modular mounting block and into a detent receiving hole of sad gauge bar for urging each said associated modular muting block toward said gauge bar and said tab into at least one of said recesses and for removably securing each said associated modular mounting block to said gauge bar in a vertically nonadjustable position with respect to said gauge bar.*

*27. The gauging module assembly defined in claim 26, wherein each said detent is constructed and arranged to be threadedly received in said detent receiving hole to urge the at least one tab of the modular mounting block into at least one of the recesses of said spaced recesses while also urging the rear surface of the modular mounting block against the side of the gauge bar.*

*28. The gauging module assembly defined in claim 26, each said modular mounting block including a stop positioned on the rear surface of said modular mounting block for positioning said modular mounting block on the gauge bar as said at least one tab of the modular mounting block is moved into one of the recesses of said spaced recesses.*

*29. The gauging module assembly defined in claim 26, wherein said gauging elements comprise loopers.*

*30. The gauging module assembly defined in claim 26, wherein said gauging elements comprise needles.*

*31. A gauging module assembly for a tufting machine having an elongated gauge bar defining a substantially flat side extending along at least a portion of the length of the gauge bar, spaced recesses defined within the side of the gauge bar and extending at least partially along the length thereof and detent receiving holes defined within the side of the gauge bar, said gauging module assembly comprising:*

*a plurality of modular mounting blocks for being received on the side of the gauge bar, each said modular mounting block defining a hole therein and having:*

*(i) a rear surface;*

*(ii) spaced parallel tufting machine gauging elements protruding from said modular mounting block, each said gauging element having a proximal end and a spaced distal end, the proximal ends of said gauging elements being embedded in said modular mounting block so that the distal ends of said gauging elements extend away from the modular mounting block;*

*(iii) at least one tab on said rear surface; and*

*a detent individual to each of said modular mounting blocks for removably securing said modular mounting blocks, respectively, to said gauge bar, each said detent being constructed and arranged to urge the at least one tab of the respective modular mounting blocks sidewise into respective ones of the recesses of said spaced recesses while also urging the rear surface of the modular mounting block against the side of the gauge bar, said detent being received within said hole in an associated one of said modular mounting blocks and within a detent receiving hole of said gauge bar for removably securing said respective modular mounting block to said gauge bar in a vertically nonadjustable position with respect to said gauge bar.*

*32. The gauging module assembly defined in claim 31, said at least one tab being sized and shaped to be received within at least one of the recesses of said spaced recesses.*

*33. The gauging module assembly defined in claim 31, each said modular mounting block including a stop, said stop being positioned on the rear surface of said modular mounting block for positioning said modular mounting block on the gauge bar as said at least one tab of the modular mounting block is moved into one of the recesses of said spaced recesses.*

*34. The gauging module assembly defined in claim 33, said modular mounting block including a bottom surface perpendicular to said rear surface, said stop being positioned on said rear surface adjacent said bottom surface and extending at least partially along the length of said bottom surface.*

*35. The gauging module assembly defined in claim 34, wherein said stop comprises an elongate member extending parallel to said bottom surface.*

*36. The gauging module assembly defined in claim 31, wherein the respective recesses of said spaced recesses each comprise a recessed channel defined within the side of the gauge bar.*

*37. The gauging module assembly defined in claim 36, wherein the at least one tab of each said mounting block comprises a raised member defined on the rear surface of the modular mounting block, said raised member being sized and shaped to be received within one of said channels in the side of the gauge bar.*

*38. The gauging module assembly defined in claim 31, wherein each said modular mounting block further comprises a pair of opposed and parallel side surfaces extending from said rear surfaces and wherein said modular mounting blocks are received on said gauge bar in a side-by-side relationship.*

*39. The gauging module assembly defined in claim 31, wherein said gauging elements comprise loopers.*

*40. The au module assembly defined in claim 31, wherein said gauging elements comprise needles.*

*41. A gauge module assembly for use on a tufting machine having an elongated gauge bar defining a substantially flat side extending along at least a portion of the length of the gauge bar, spaced recesses defined within the side of the gauge bar and extending at least partially along the length thereof and detent receiving holes defined within the side of the gauge bar, said gauging module assembly comprising:*

*a plurality of modular mounting blocks for being received on the side of the gauge bar, each said modular mounting block defining a hole therein and having:*

*(i) a rear surface, and a pair of opposed side surfaces extending from said rear surface;*

*(ii) spaced tufting machine gauging elements protruding from said modular mounting block, each said gauging element having a proximal end and a spaced distal end, the proximal ends of said gauging elements being embedded in said modular mounting block so that the distal ends of said gauging elements extend away from the modular mounting block;*

*(iii) at least one tab on said rear surface, said at least one tab being sized and shaped to be received within at least one of the recesses of said spaced recesses;*

*wherein each respective one of said modular mounting blocks is constructed and arranged to be mounted on said gauge bar by placing the rear surface of said modular mounting block on the side of the gauge bar and moving said at least one tab sidewise into at least one of the recesses of said spaced recesses;*

*and wherein said modular mounting blocks are received on the side of said gauge bar in a side-by-side relationship in which the side surfaces of each said modular mounting block are adjacent to the side surfaces of adjacent ones of said modular mounting blocks; and a detent individual to each of said modular mounting blocks for removably securing said modular mounting blocks, respectively, to said gauge bar by passing sad detent into said hole in said modular mounting block and into a detent receiving hole of said gauge bar, said detent for each said modular mounting block being constructed and arranged to urge the at least one tab of the modular mounting block into one of the recesses of said spaced recesses while also urging the rear surface of the modular mounting block against the side of the gauge bar wherein said modular mounting block is held in a vertically nonadjustable position with respect to said gauge bar.*

*42. The gauging module assembly defined in claim 41, each said modular mounting block including a stop, said stop being positioned on the rear surface of said modular mounting block for positioning said modular mounting block on the gauge bar as said at least one tab of the modular mounting block is moved into one of the recesses of said spaced recesses.*

*43. The gauge module assembly defined in claim 41, wherein said gauging elements comprise loopers.*

*44. The gauging module assembly defined in claim 41, wherein said gauging elements comprise needles.*

*45. A gauging module assembly for use on a tufting machine having an elongated gauge bar, said gauge bar defining a substantially flat side extending along at least a portion of the length of said gauge bar and defining detent receiving holes within the side of the gauge bar, said gauging module assembly comprising:*

*(a) a plurality of modular mounting blocks for being received on the side of the gauge bar, each said modular mounting block defining a hole therein and having a rear surface and a plurality of spaced tufting machine gauging elements protruding from said modular mounting block, each said gauging element having a proximal end and a space distal end, the proximal ends of said gauging elements being embedded in said modular mounting block so that the distal ends of said gauging elements extend away from the modular mounting block;*

*(b) a plurality of spaced first mounts extending at least partially along the side of said gauge bar;*

*(c) a second mount on the rear surface of each said modular mounting block, each said second mount being constructed and arranged to be operably engaged with at least one of said first mounts for positioning said modular mounting blocks on said gauge bar; and*

*(d) a detent individual to each of said modular mounting blocks, the detent of each respective one of said modular mounting blocks being constructed and arranged to urge the rear surface of the modular mounting block sidewise against the side of the gauge bar and to simultaneously urge the respective ones of the first mounts and the second mounts into engagement with one another as said respective detent is passed into sad respective hole of each respective said modular mounting block and into a detent receiving hole in said gauge bar, wherein said modular mounting block is held in a vertically nonadjustable position with respect to said gauge bar.*

*46. The gauging module assembly defined in claim 45, wherein each sad modular mounting block further comprises a pair of parallel and opposed side surfaces, and wherein said modular mounting blocks are received on said gauge bar in a side-by-side relationship.*

*47. The gauging module assembly defined in claim 46, wherein said first mounts comprise sidewise opening recesses defined in said gauge bar and said second mounts comprise at least one tab.*

*48. The gauge module assembly defined in claim 45, wherein said gauging elements comprise loopers.*

*49. The gauging module assembly defined in claim 45, wherein said gauging elements comprise needles.*

*50. The gauging module assembly defined in claim 45, each said modular mounting block including a stop positioned on the rear surface of said modular mounting block for positioning said modular mounting block on the gauge bar as said detent urges the respective ones of said modular mounting blocks against the side of the gauge bar.*

*51. In a tufting machine of the type in which a reciprocating needle gauge bar moves toward and away from a tufting zone as the loopers of the tufting machine are simultaneously reciprocated toward and away from the tufting zone, the improvement comprising:*

*(a) a flat side defined on the needle gauge bar, said flat side defining a plurality of spaced recesses therein, said flat side also defining a plurality of spaced detent receiving holes therein;*

*(b) a plurality of modular mounting blocks mounted side by side on said flat side of the needle gauge bar, each of said modular mounting blocks defining a hole therein;*

*(c) a plurality of spaced needles carried by each of said modular mounting blocks, said needles being embedded in each of said modular mounting blocks so that each said modular mounting block retains said needles in a spaced, parallel relationship with respect to one another according to a predetermined gauge of the tufting machine, each said modular mounting block including a tab for being received sidewise within one of said spaced recesses defined in said flat side of the needle gauge bar when said modular mounting blocks are moved toward said needle gauge bar; and*

*(d) a detent individual to each of said modular mounting blocks for removably securing that modular mounting block against the flat side of the needle gauge bar in a vertically nonadjustable position with respect to the needle gauge bar as said detent is passed into said respective hole in said modular block and into one of said detent receiving holes, said detent urging said tab into one of said spaced recesses and also urging said modular mounting block against said flat side of the needle gauge bar.*

*52. In a tufting machine of the type in which a reciprocating looper gauge bar moves toward and away from a tufting zone as the needles of the tufting machine are simultaneously reciprocated toward and away from the tufting zone for inserting yarns through a backing material, the improvement comprising:*

*(a) a reed gauge bar, said reed gauge bar defining a flat side, said flat side defining a plurality of spaced*

*recesses therein, said flat side also defining a plurality of spaced detent receiving holes therein;*

(*b*) *a plurality of modular mounting blocks mounted side by side on said flat side of the reed gauge bar each of said modular mounting blocks defining a hole therein;*

(*c*) *a plurality of spaced reeds carried by each of said modular mounting blocks, said reeds being embedded in each of said modular mounting blocks so that each said modular mounting block retains the reeds in a spaced, parallel relationship with respect to one another according to a predetermined gauge of the tufting machine, each said modular mounting block including a tab for being received sidewise within one of said spaced recesses defined in said flat side of the reed gauge bar when said modular mounting blocks are moved toward said reed gauge bar; and*

(*d*) *a detent individual to each of said modular mounting blocks for removably securing that modular mounting block against the flat side of reed gauge bar in a horizontally nonadjustable position with respect to said reed gauge bar as said detent is passed into said respective hole in said modular block and into one of said detent receiving holes, said detent urging said tab into one of said spaced recesses and also urging said modular mounting block against said flat side of said reed gauge bar.*

* * * * *